United States Patent
Kumar et al.

(10) Patent No.: US 11,303,545 B2
(45) Date of Patent: Apr. 12, 2022

(54) RATE-LIMITING BASED ON CARDINALITY COMPUTATION

(71) Applicant: eBay Inc., San Jose, CA (US)

(72) Inventors: Sudeep Kumar, San Jose, CA (US); Mahesh Somani, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/562,769

(22) Filed: Sep. 6, 2019

(65) Prior Publication Data

US 2021/0075702 A1    Mar. 11, 2021

(51) Int. Cl.
*H04L 12/00*  (2006.01)
*H04L 43/022*  (2022.01)
*H04L 43/028*  (2022.01)
*G06F 16/22*  (2019.01)

(52) U.S. Cl.
CPC .......... *H04L 43/022* (2013.01); *G06F 16/22* (2019.01); *H04L 43/028* (2013.01)

(58) Field of Classification Search
CPC .......... G06F 16/2462; G06F 16/24545; G06F 16/215; G06F 21/6254; G06F 16/137; H04L 43/00; G06T 1/00; H04W 4/21
USPC .................................................. 709/224, 225
See application file for complete search history.

(56) References Cited

U.S. PATENT DOCUMENTS

| | | | |
|---|---|---|---|
| 7,203,685 B2* | 4/2007 | Abdo ................. | G06F 16/2462 707/713 |
| RE40,063 E | 2/2008 | Doktor | |
| 8,400,458 B2* | 3/2013 | Wu ........................ | G06T 1/00 345/501 |
| 8,463,811 B2* | 6/2013 | Lakshmanan ......... | G06F 16/215 707/776 |
| 8,856,029 B1* | 10/2014 | Khan .................... | H04W 4/029 705/14.58 |
| 9,529,837 B2* | 12/2016 | Meng .................... | G06F 9/5072 |
| 9,552,408 B2* | 1/2017 | Malewicz ............. | G06F 16/137 |
| 10,148,623 B2* | 12/2018 | Tidwell ............... | G06F 21/6254 |
| 10,210,246 B2* | 2/2019 | Stojanovic ........... | G06F 16/248 |
| 10,311,044 B2 | 6/2019 | Gebremariam | |
| 10,530,787 B2* | 1/2020 | Avrahami .......... | H04L 63/1441 |
| 10,534,775 B2* | 1/2020 | Moerkotte ........ | G06F 16/24545 |
| 10,782,880 B2* | 9/2020 | Kim ........................ | G06F 3/067 |
| 2008/0306903 A1* | 12/2008 | Larson ................ | G06F 16/2462 |

(Continued)

OTHER PUBLICATIONS

Hu et al., "Discovering the Intrinsic Cardinality and Dimensionality of Time Series using MDL", 11th IEEE International Conference on Data Mining, 2011, 6 Pages.

*Primary Examiner* — Frantz Coby
(74) *Attorney, Agent, or Firm* — FIG. 1 Patents

(57) ABSTRACT

A cloud-based service records time-series data of a plurality of metrics from a plurality of tenants. The time-series data comprises a series of measures of a metric at sequential points in time. The time-series data is recorded in database tables in a manner that consumes more resources when the cardinality of the time-series data is high. When the cardinality of the data for the tenant is too high, the tenant is blacklisted and further data for the tenant is not stored. In addition to identifying incoming time-series data by the tenant that produced it, the data may also identify its type. In this case, the cardinality of each type of data may be determined and the types of data may be individually allowed or blacklisted for the tenant.

20 Claims, 7 Drawing Sheets

(56) References Cited

U.S. PATENT DOCUMENTS

| | | | |
|---|---|---|---|
| 2009/0296594 A1* | 12/2009 | Cao | H04L 43/00 370/252 |
| 2013/0060792 A1* | 3/2013 | Weissman | G06F 16/2462 707/754 |
| 2014/0330884 A1* | 11/2014 | Meng | H04L 67/10 709/201 |
| 2018/0030775 A1 | 2/2018 | Walsh et al. | |
| 2018/0307758 A1 | 10/2018 | Reiser | |
| 2020/0379963 A1* | 12/2020 | Lopes | G06F 16/24549 |
| 2021/0035026 A1* | 2/2021 | Bansal | G06F 11/0709 |

* cited by examiner

BLACKLIST TABLE — 310

| TENANT ID | DATA ID | START TIME | EXPIRATION |
|---|---|---|---|
| 101 | ALL | 2019-08-02 12:19:00 | 2019-08-03 12:19:00 |
| 103 | 1003 | 2019-08-02 14:30:00 | 2019-08-02 15:30:00 |

CARDINALITY TABLE — 340

| TENANT ID | DATA TYPE | CARDINALITY |
|---|---|---|
| 101 | 1001 - TOTAL LATENCY | 7974287 |
| 102 | 1002 - QUERY COUNT | 7922590 |
| 103 | 1003 - ERROR COUNT | 7113116 |
| 104 | 1004 - ROW COUNT | 7074135 |

THRESHOLD TABLE — 370

| TENANT ID | DATA TYPE | CARDINALITY |
|---|---|---|
| 101 | ALL | 7500000 |
| 102 | 1002 - QUERY COUNT | 8000000 |
| 103 | 1003 - ERROR COUNT | 7000000 |
| 103 | ALL | 8000000 |

*FIG. 3*

RATE-LIMITING BASED ON CARDINALITY COMPUTATION

TECHNICAL FIELD

The subject matter disclosed herein generally relates to cloud computing. Specifically, in some example embodiments, the present disclosure addresses mechanisms to compute cardinality for a tenant and to limit data processed based on the cardinality computation.

BACKGROUND

Metric data storage stores time-series data reported by clients. The total data storage needed is impacted more by the cardinality of the data than by the number of time-series entries stored. As the cardinality of the data increases, additional shards are added to the database cluster storing the time-series data.

BRIEF DESCRIPTION OF THE DRAWINGS

Some embodiments are illustrated by way of example and not limitation in the figures of the accompanying drawings.

FIG. 3 is a block diagram illustrating a database schema suitable for recording cardinality of data provided by tenants and identifying tenants blacklisted based on the cardinality of the data provided, according to some example embodiments.

DETAILED DESCRIPTION

Figure 1:
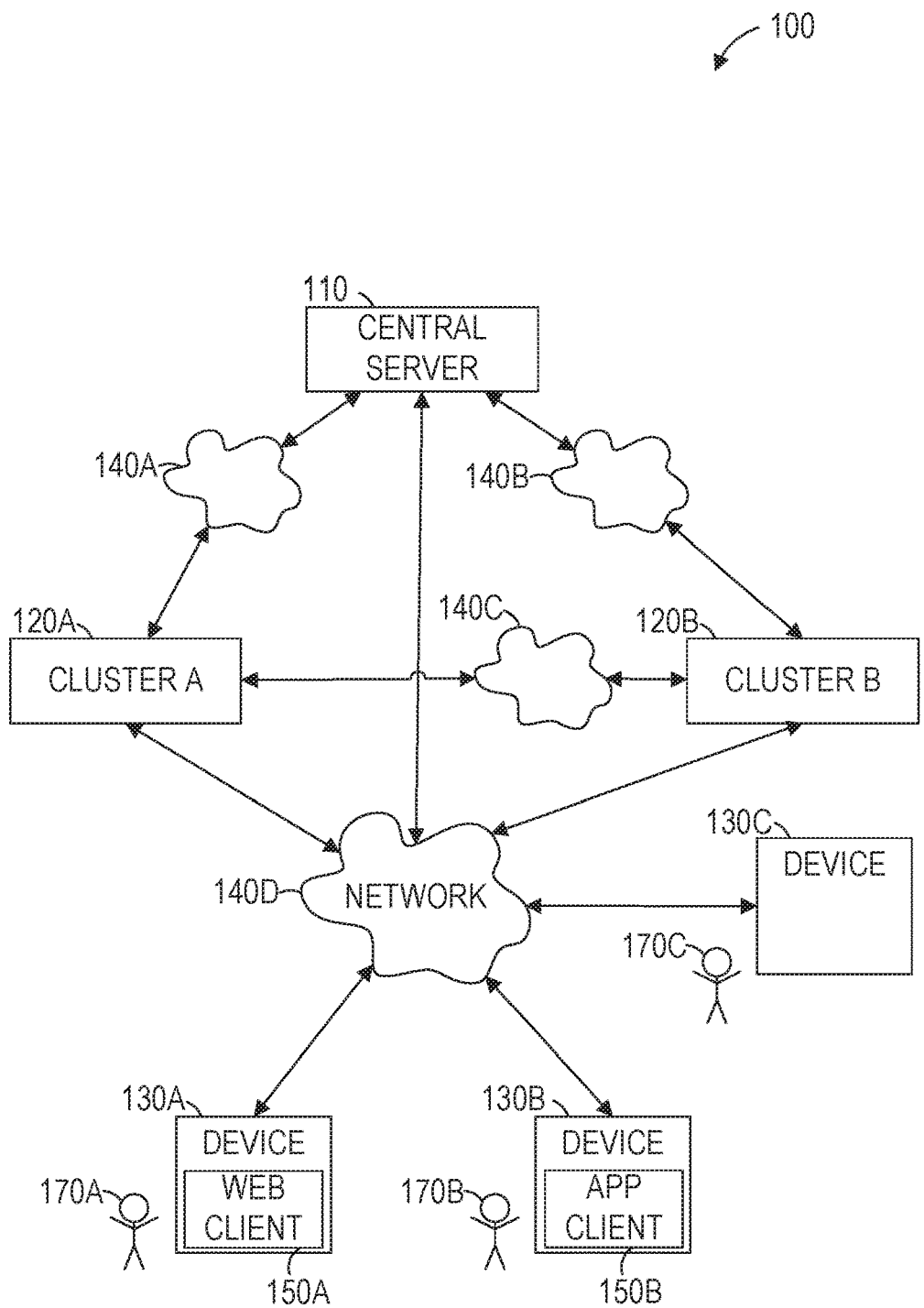
FIG. 1 is a network diagram illustrating a network environment suitable for computing cardinality for a tenant and rate-limiting based on the cardinality computation, according to some example embodiments.

Example methods and systems are directed to computing cardinality for a tenant and limiting data processed based on the cardinality computation. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A cloud-based service records time-series data of a plurality of metrics from a plurality of tenants. Each tenant is a logical entity (e.g., a business, charity, non-profit, department, or other organizational group) comprising one or more client devices. The time-series data comprises a series of measures of a metric at sequential points in time. The source of data may be identified using a tenant identifier or a client identifier that is used to determine the corresponding tenant. The cloud-based service stores the time-series data for later use. Example uses of the time-series data include anomaly detection, intrusion detection, resource allocation, and the like.

The time-series data is recorded in database tables in a manner that consumes more resources when the cardinality of the time-series data is high. In general, the cardinality of a data set is the number of different values in the data set. By contrast, the size of a data set is the number of values in the data set. Thus, the size and the cardinality of a data set are the same only when every value in the data set is different. As used herein, the phrase "cardinality of time-series data" refers to the number of distinct time-series. For example, if one thousand client devices associated with a first tenant are reporting CPU usage data every minute, the cardinality of the time-series data for the first tenant is one thousand. If the one thousand client devices were reporting both CPU usage data and memory usage data, the cardinality of the time-series data for the first tenant would be two thousand—the product of the number of client devices for the tenant that are reporting time-series data with the number of time-series data being reported by each client. As another example, if five thousand client devices associated with a second tenant are reporting CPU usage data every five minutes, the cardinality of the time-series data for the second tenant is five thousand. Note that the total amount of time-series data provided by the first and second tenants are the same, with an average of one thousand data values being provided every minute.

Furthermore, a single client device may report multiple time-series data of the same type, which further increases cardinality. For example, if a client device were, in error, running three copies of the same application that reports time-series data, those three sets of time-series data would increase the cardinality by three instead of only by one. As another example, multiple sets of time-series data may be treated as being of the same type, increasing the cardinality of that type. To illustrate, if CPU usage data is reported for each processor on a multi-processor client device, the cardinality increase for CPU usage data resulting from data reported by the single device is the number of processors, not just one. As another illustration, data may be reported as multiple values (e.g., as a histogram of observations since data was last reported, with the observations divided into predetermined ranges). Each of the separate values reported with each entry in the time-series data increases the cardinality.

Existing systems are able to block further incoming data from a tenant when the size of the data set from the tenant exceeds a threshold, but do not perform rate-limiting (i.e., limiting the rate at which data is accepted by the cloud-based service) in response to a cardinality computation. Many storage solutions respond to a high degree of cardinality by allocating additional database shards to a cluster of database shards in a distributed database, thus keeping the cardinality per shard below the threshold. However, this solution requires additional hardware to be allocated for the tenant. Using the systems and methods described herein, a cardinality for a tenant is determined across all database clusters and, using the cardinality and a threshold, excessive cardinality for the tenant is detected. When the cardinality of the data for the tenant is too high, the tenant is blacklisted and further data for the tenant is not stored. Additionally, the tenant may be informed of the blacklisting, to allow for correction of the problem.

In addition to identifying incoming time-series data by the tenant that produced it, the data may also identify its type, allowing differentiation between data streams produced by the same tenant. In this case, the cardinality of each type of data may be determined and the types of data may be individually allowed or blacklisted for the tenant. In this way, a problem that causes excessive cardinality for only one metric can be responded to by blocking only the time-series data for that metric while time-series data for other metrics are unaffected. When considering the cardinality of a single type of time-series data for a tenant, the number of time-series data is 1. Since the cardinality of time-series data is the product of the number of client devices reporting the time series data with the number of time-series data, the cardinality of a single type of time-series data is just the number of client devices reporting the time-series data for the tenant. For example, a tenant may have one thousand client devices, with five hundred of them reporting one type of time-series data and all one thousand reporting another type of time-series data. Accordingly, the cardinality of the first type of time-series data is less than the cardinality of the second type of time-series data and, depending on the threshold used, further data of the second type may be blocked while data of the first type continues to be processed. Individual metric threshold-based blacklisting is managed, in some example embodiments, by custom policy profiles maintained at the more granular metric level. The threshold for an individual metric may be the same for all tenants or defined on a tenant-specific basis.

To determine the cardinality of a data set over multiple clusters, a cardinality server on each shard of each cluster intercepts the incoming time-series data and determines the cardinality of the time-series data stored on the shard. A central assessment service reads all cardinality information from all shards and, based on the read data, determines the cardinality of the time-series data from the tenant. In some example embodiments, the central assessment service determines the cardinality of the time-series data from the tenant to be the highest cardinality reported by the shards. Based on the cardinality and a predetermined threshold, the cardinality server determines whether to allow or block further time-series data from the tenant.

Technical problems exist with respect to handling incoming time-series data for database storage efficiently. The systems and methods described herein seek to address these problems by using cardinality servers in combination with a central assessment service to detect and block high-cardinality data streams. As a result of this technical improvement, anomalous is behavior is detected quickly and affected tenants are notified, and hardware resources that would be used in storing the high-cardinality data are saved.

Additionally, computing resources may be saved by using the systems and methods described herein, which is a further technical improvement. Examples of such computing resources include processor cycles, network traffic, memory usage, data storage capacity, power consumption, and cooling capacity. As just one example, by blocking high-cardinality data from being processed, network, storage, and processing resources will be saved that would have been consumed by processing the blocked data, saving processor cycles, memory usage, network bandwidth or other computing resources associated with handling network traffic.

FIG. 1 is a network diagram illustrating a network environment 100 suitable for computing cardinality for a tenant and rate-limiting based on the cardinality computation, according to some example embodiments. The network environment 100 includes a central server 110, clusters 120A and 120B, and devices 130A, 130B, and 130C communicatively coupled to each other via networks 140A, 140B, 140C, and 140D. The clusters 120A-120B may be collectively referred to as "clusters 120" or generically referred to as a "cluster 120." The devices 130A-130C may be collectively referred to as "devices 130," or generically referred to as a "device 130." The networks 140A-140D may be collectively referred to as "networks 140" or generically referred to as a "network 140." The devices 130 may interact with the central server 110 using a web client 150A or an app client 150B. The central server 110 and the devices 130 may each be implemented in a computer system, in whole or in part, as described below with respect to FIG. 2. Though shown as single elements, the clusters 120A and 120B may be composed of multiple computing devices, each operating as a shard of a distributed database, and each of which may be implemented in a computer system as described below with respect to FIG. 2.

The central server 110 provides a cardinality service that determines the cardinality of time-series data provided by devices 130 of a tenant. The time-series data is stored on the clusters 120. Each of the clusters 120 determines the cardinality of the portion of the time-series data stored on the cluster and communicates the cardinality for the cluster to the central server 110. The central server 110 determines, based on the received cardinalities from the clusters 120, a cardinality for the time-series data from the tenant. Based on the cardinality, the central server 110 allows further time-series data from the tenant to be stored or blocks the further time-series data.

As an example, a server of each of the clusters 120 determines a cardinality for the portion of the data stored by the cluster 120 using the HyperLogLog algorithm. The server may publish its cardinality information on a hypertext transport protocol (HTTP) endpoint. For example, using the uniform resource locator, http://${hostname}:8091/admin/cardinality. In this example, ${hostname} is the name of the host of the data and 8091 is the port through which the data is accessed.

The basis of the HyperLogLog algorithm is the observation that the cardinality of a multiset of uniformly distributed random numbers can be estimated by calculating the maximum number of leading zeros in the binary representation of each number in the set. If the maximum number of leading zeros observed is n, an estimate for the number of distinct elements in the set is $2^n$. In the HyperLogLog algorithm, a hash function is applied to each element in the original multiset to obtain a multiset of uniformly distributed random numbers with the same cardinality as the original multiset. The cardinality of this randomly distributed set can then be estimated using the algorithm above. The simple estimate of cardinality obtained using the algorithm above has the disadvantage of a large variance. In the HyperLogLog algorithm, the variance is minimized by splitting the multi set into numerous subsets, calculating the maximum number of leading zeros in the numbers in each of these subsets, and using a harmonic mean to combine these estimates for each subset into an estimate of the cardinality of the whole set.

A cardinality for the set of devices is determined, by the central server 110 based on the cardinality for the tenant received from each of the clusters 120 and sums the received cardinalities to determine a cardinality for the tenant over all clusters 120.

The web client 150A or the app client 150B provides a user interface to view cardinality data, to view or modify the blacklist status of tenants, or both. Additionally, the web client 150A or the app client 150B may operate without user intervention to provide time-series data to the central server 110, a cluster 120, or both.

Also shown in FIG. 1 are users 170A, 170B, and 170C that may be referred to generically as "a user 170" or collectively as "users 170." Each user 170 may be a human user (e.g., a human being), a machine user (e.g., a computer configured by a software program to interact with the devices 130 and the central server 110), or any suitable combination thereof (e.g., a human assisted by a machine or a machine supervised by a human). The users 170 are not part of the network environment 100 but are each associated with one or more of the devices 130 and may be users of the devices 130 (e.g., the user 170A may be an owner of the device 130A, the user 170B may be an owner of the device 130B, and the user 170C may be an owner of the device 130C). For example, the device 130A may be a desktop computer, a vehicle computer, a tablet computer, a navigational device, a portable media device, or a smartphone belonging to the user 170A.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 2. As used herein, a "database" is a data storage resource that stores data structured as a text file, a table, a spreadsheet, a relational database (e.g., an object-relational database, a NoSQL database, a network or graph database), a triple store, a hierarchical data store, a key-value store, or any suitable combination thereof. Additionally, data accessed (or stored) via an application programming interface (API) or remote procedure call (RPC) may be considered to be accessed from (or stored to) a database. Moreover, any two or more of the machines, databases, or devices illustrated in FIG. 1 may be combined into a single machine, database, or device, and the functions described herein for any single machine, database, or device may be subdivided among multiple machines, databases, or devices.

Each network 140 may be any network that enables communication between or among machines, databases, and devices (e.g., the central server 110, the clusters 120, and the devices 130). Accordingly, each network 140 may be a wired network, a wireless network (e.g., a mobile or cellular network), or any suitable combination thereof. Each network 140 may include one or more portions that constitute a private network, a public network (e.g., the Internet), or any suitable combination thereof.

Figure 2:
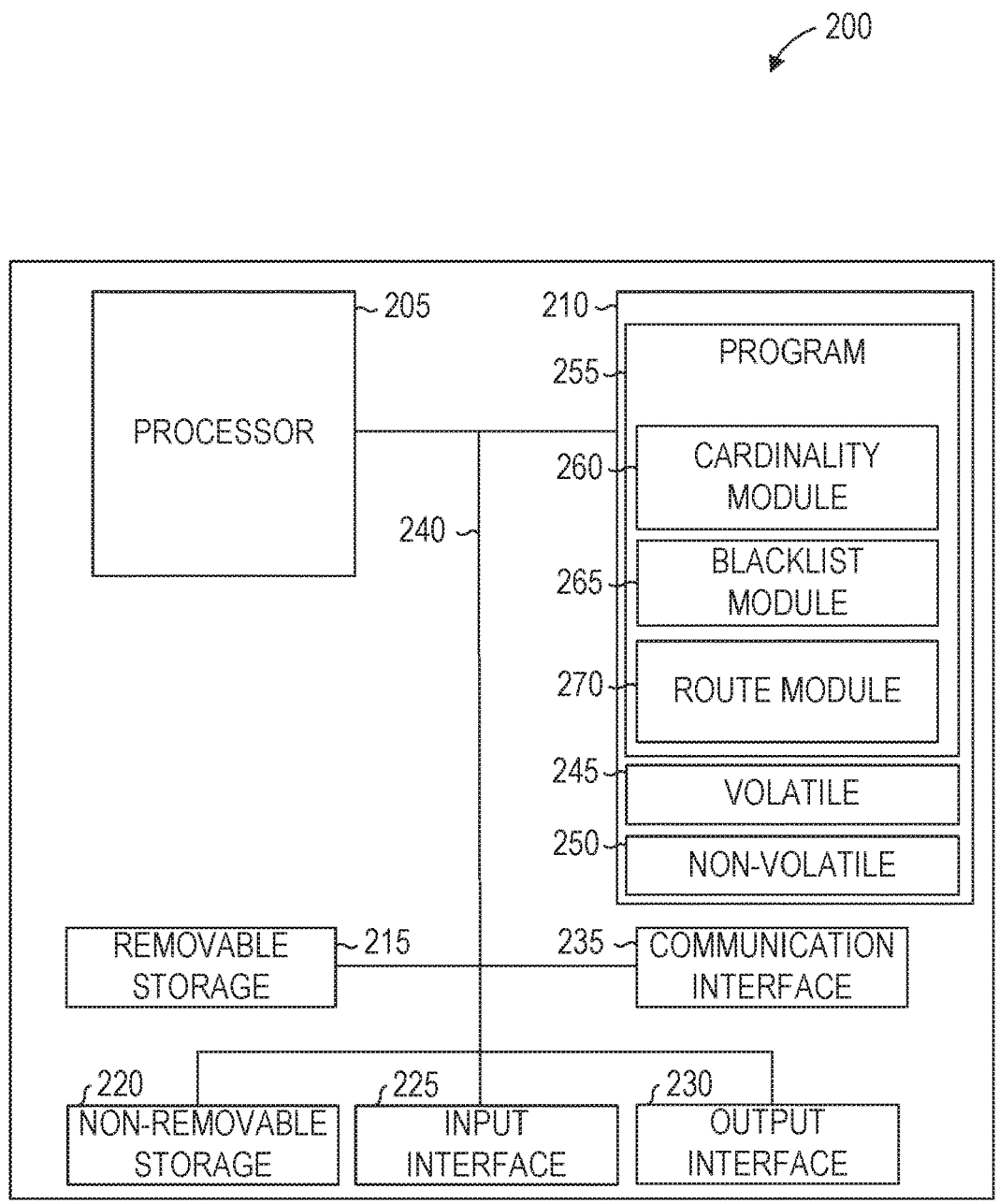
FIG. 2 is a block diagram illustrating components of a computer (e.g., a server), according to some example embodiments.

FIG. 2 is a block diagram illustrating components of a computer 200 (e.g., the central server 110), according to some example embodiments. All components need not be used in various embodiments. For example, clients, servers, autonomous systems, and cloud-based network resources may each use a different set of components, or, in the case of servers for example, larger storage devices.

One example computing device in the form of the computer 200 (also referred to as a computing device 200 and a computer system 200) includes a processor 205, a computer-storage medium 210, removable storage 215, and non-removable storage 220, all connected by a bus 240. Although the example computing device is illustrated and described as the computer 200, the computing device may be in different forms in different embodiments. For example, the computing device 200 may instead be a smartphone, a tablet, a smartwatch, or another computing device including elements the same as or similar to those illustrated and described with regard to FIG. 2. Devices such as smartphones, tablets, and smartwatches are collectively referred to as "mobile devices." Further, although the various data storage elements are illustrated as part of the computer 200, the storage may also or alternatively include cloud-based storage accessible via a network, such as the Internet, or server-based storage.

The computer-storage medium 210 includes volatile memory 245 and non-volatile memory 250. The volatile memory 245 or the non-volatile memory 250 stores a program 255. The computer 200 may include, or have access to, a computing environment that includes a variety of computer-readable media, such as the volatile memory 245, the non-volatile memory 250, the removable storage 215, and the non-removable storage 220. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 200 includes or has access to a computing environment that includes an input interface 225, an output interface 230, and a communication interface 235. The output interface 230 interfaces to or includes a display device, such as a touchscreen, that also may serve as an input device. The input interface 225 interfaces to or includes one or more of a touchscreen, a touchpad, a mouse, a keyboard, a camera, one or more device-specific buttons, one or more sensors integrated within or coupled via wired or wireless data connections to the computer 200, and other input devices. The computer 200 may operate in a networked environment using the communication interface 235 to connect to one or more remote computers, such as database servers. The remote computer may include a personal computer (PC), server, router, network PC, peer device or other common network node, or the like. The communication interface 235 may connect to a local-area network (LAN), a wide-area network (WAN), a cellular network, a WiFi network, a Bluetooth network, or other networks.

Computer instructions stored on a computer-storage medium (e.g., the program 255 stored in the computer-storage medium 210) are executable by the processor 205 of the computer 200. As used herein, the terms "machine-storage medium," "device-storage medium," and "computer-storage medium" (referred to collectively as "machine-storage medium") mean the same thing and may be used interchangeably. The terms refer to a single or multiple storage devices and/or media (e.g., a centralized or distributed key-value store, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors 205.

Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and signal media. Thus, the terms include both storage devices/media and carrier waves/modulated data signals.

The program 255 may further be transmitted or received over the networks 140 using a transmission medium via the communication interface 235 and utilizing any one of a number of well-known transfer protocols (e.g., HTTP). Examples of networks 140 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions for execution by the computer 200, and includes digital or analog communications signals or other intangible media to facilitate communication of such software.

The program 255 is shown as including a cardinality module 260, a blacklist module 265, and a route module 270. Any one or more of the modules described herein may be implemented using hardware (e.g., a processor of a machine, an application-specific integrated circuit (ASIC), an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The cardinality module 260 of the central server 110 interacts with the cardinality module 260 of a server of the clusters 120 to determine a cardinality for time-series data from a tenant. For example, the devices 130A and 130C may be associated with a single tenant identifier and provide time-series data to the clusters 120 for storage. The cardinality module 260 of a server of each cluster 120 determines a cardinality for the portion of the time-series data stored on the cluster and provides the cardinality to the cardinality module 260 of the central server 110. While in some example embodiments, a tenant corresponds to a client device, more commonly multiple client devices are assigned to a single tenant identifier. Based on the received cardinalities for the clusters 120, the cardinality module 260 of the central server 110 determines a cardinality for the time-series data across all clusters 120. In some example embodiments, the cardinality determined by the cardinality module 260 of the central server 110 is the sum of the received cardinalities.

The blacklist module 265 determines which time-series data is blacklisted based on a cardinality determined by the cardinality module 260 and a predetermined threshold (e.g., an administrator-defined threshold on a per tenant, per data type, or per data type per tenant basis). The blacklisting may be for a tenant or for a particular type of data for a tenant. The blacklisting may be permanent (until reversed by user interaction) or for a predetermined period of time (e.g., an hour, a day, or a week).

The route module 270 intercepts incoming requests to write time-series data to a database stored on the clusters 120. Based on a tenant identifier of the time-series data and blacklist data provided by the blacklist module 265, the route module 270 determines whether to allow the received time-series data to be stored or not.

FIG. 3 is a block diagram illustrating a database schema 300 suitable for recording cardinality of data provided by tenants and identifying tenants blacklisted based on the cardinality of the data provided, according to some example embodiments. The database schema 300 is suitable for use by the cardinality module 260, the blacklist module 265, and the route module 270. The database schema 300 includes a blacklist table 310, a cardinality table 340, and a threshold table 370. The blacklist table 310 is defined by a table definition 320, including a tenant identifier field, a data identifier field, a start time field, and an expiration field. The blacklist table 310 includes rows 330A and 330B. The cardinality table 340 is defined by a table definition 350, including a tenant identifier field, a data type field, and a cardinality field. The cardinality table 340 includes rows 360A, 360B, 360C, and 360D. The threshold table 370 is defined by a table definition 380, including a tenant identifier field, a data type field, and a cardinality field. The threshold table 370 includes rows 390A, 390B, 390C, and 390D.

Each of the rows 330A-330B stores information for a blacklisted tenant. The tenant identifier field stores a unique identifier for the blacklisted tenant. The data identifier field comprises one or more identifiers for the types of data that are blacklisted for the tenant. Thus, the row 330A indicates that all data is blacklisted for the tenant identifier 101 and the row 330B indicates that data of type 1003 is blacklisted for the tenant identifier 103. The start time and expiration fields indicate when the blacklisting began and when it expires. In some example embodiments, a NULL entry in the expiration field indicates that the blacklisting does not expire and continues indefinitely. As shown in FIG. 3, the blacklisting may be for different periods of time in different rows. The period of time for blacklisting is based on the tenant identifier, the data identifier, the cardinality for the tenant, the cardinality of the time-series data, or any suitable combination thereof. The blacklist table 310 may be populated by the blacklist module 265 and accessed by the route module 270.

Each of the rows 360A-360D stores information for a cardinality for a data type for a tenant. The data type corresponds to the data identifier of the blacklist table 310. By way of example, the cardinality table 340 shows cardinalities for data types of total latency, query count, error count, and row count, for four different tenants. The cardinality table 340 may be populated by the cardinality module 260 and accessed by the blacklist module 265.

Each row of the threshold table 370 stores information for a threshold cardinality for a data type for a tenant. The data type corresponds to the data type of the cardinality table 340 and the data identifier of the blacklist table 310. The row 390A indicates that when the total cardinality for tenant 101 exceeds 7.5 million, all further data for the tenant is to be blacklisted. The row 390B indicates that when the cardinality for data type 1002 for tenant 102 exceeds 8 million, data type 1002 is blacklisted for tenant 102. The row 390C indicates that when the cardinality for data type 1003 for tenant 103 exceeds 7 million, data type 103 is blacklisted for tenant 103. The row 390D indicates that when the total cardinality for tenant 103 exceeds 8 million, all further data for the tenant is to be blacklisted. As can be seen from FIG. 3, the entries in the blacklist table 310 are consistent with the observed cardinalities stored in the cardinality table 340 and the blacklisting thresholds stored in the threshold table 370.

In some example embodiments, the cardinality table 340 stores cardinality data relating to data received over a particular period of time (e.g., one day), rather than to all data stored. In these example embodiments, the blacklists are set to expire at the end of the period of time (e.g., at midnight each night) and the thresholds apply to each period of time separately. In this way, cardinality is metered within each period of time rather than over all time.

Figure 4:
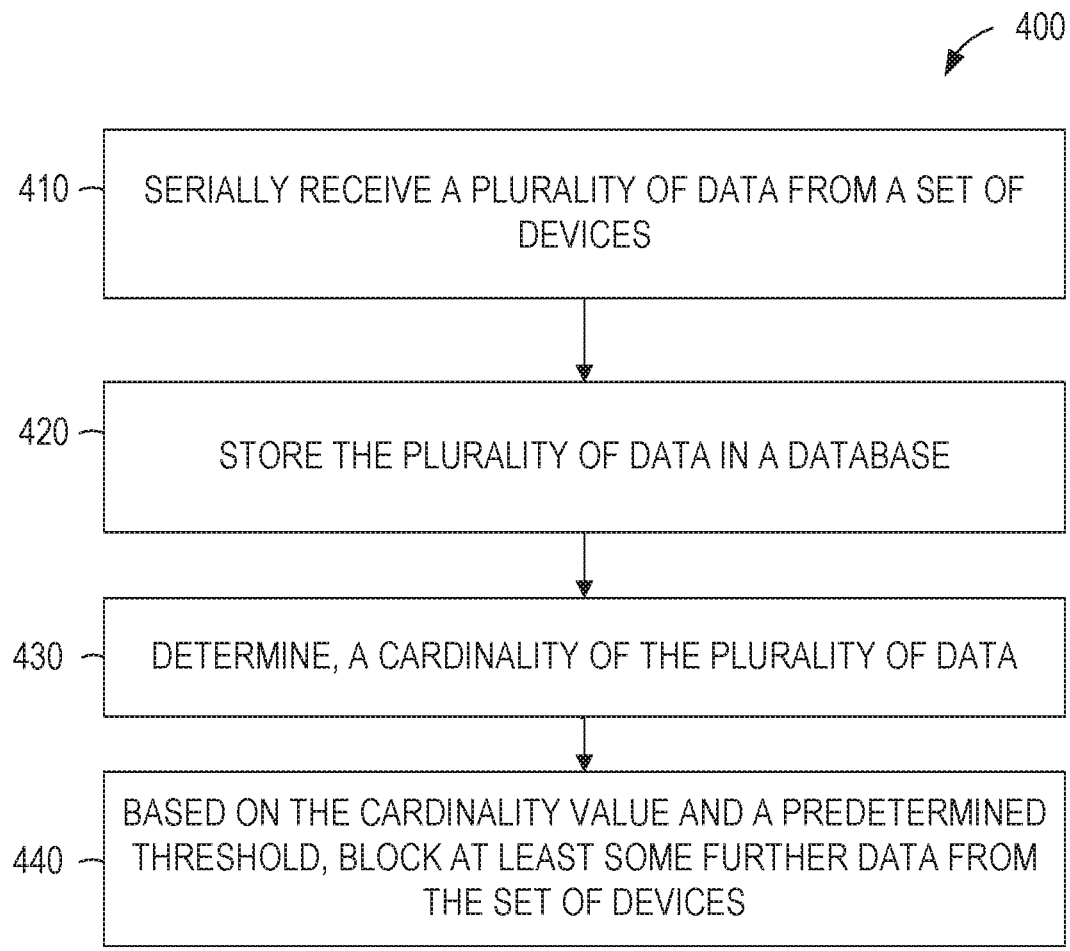
FIG. 4 is a flow diagram illustrating operations by a central server in a method of measuring and using cardinalities to block data from a tenant, according to some example embodiments.

FIG. 4 is a flow diagram illustrating operations by the central server 110 in a method 400 of measuring and using cardinalities to block data from a tenant, according to some example embodiments. The method 400 includes operations 410, 420, 430, and 440 and allows the central server 110 to block data from tenants providing time-series data of excessive cardinality while causing time-series data from other tenants to be stored on one or more of the clusters 120. By way of example and not limitation, the method 400 is described as being performed by the systems, modules, and databases of FIGS. 1-3.

In operation 410, communication interface 235 of the central server 110 serially receives a plurality of data from a set of devices (e.g., one or more of the devices 130). As an example, daemons running on a set of devices sharing a tenant identifier send time-series data to the central server 110 for storage. The data is received by one or more ingress daemons running on the central server 110.

The communication interface 235 of the central server 110, in operation 420, provides the received data to the clusters 120. As an example, the route module 270 of the central server 110 selects one of the clusters 120 for each entry in the time-series data and instructs the selected cluster 120 to store the entry. In some example embodiments, the selection of the cluster 120 is based on a hash of the entry or a hash of a portion of the entry. Thus, each cluster 120 handles a distinct portion of the time-series data, as allocated by the central server 110.

As an example, the cardinality module 260 of a server of each of the clusters 120 determines a cardinality for the portion of the data stored by the cluster 120 using the HyperLogLog algorithm. The server may publish its cardinality information on an HTTP endpoint. For example, using the uniform resource locator, http://{hostname}:8091/admin/cardinality. In this example, ${hostname} is the name of the host of the data and 8091 is the port through which the data is accessed.

The information may be provided from the HTTP endpoint using the example data format:

```
{
    "hostname": "ms-nsn-0-3",
    "startime": 1562515200,
    "endtime": 1562533400,
    "count": 5244571,
    "namespaces": [{
        "namespace": "dbmon-benchmark",
        "count": 832567,
        "names": [{
            "name": "db_AverageQueryTime",
            "count": 411636
        }, {
            "name": "db_Waits",
            "count": 410377
        }, {
            "name": "database_totalWaits",
            "count": 5268
        }, {
            "name": "database_averageHighWaterWaiters",
            "count": 5249
        }],
        "metric_count": 4
    }]
}
```

The cardinality information identifies the range of time over which the information was computed in "startime" and "endtime." namespaces[ ]→namespaces→count indicates the cardinality on the cluster for a tenant. namespaces[ ]→namespaces→names[ ]→count indicates the cardinality of an individual metric. In some example embodiments, the data reported in the names[ ] array is for the top K metric names for the tenant. K may be a predetermined number or the metrics exceeding a predetermined threshold may be reported, allowing K to vary.

A cardinality of the plurality of data is determined, in operation 430, by the cardinality module 260 of the central server 110 based on the received plurality of data. The cardinality module 260 of the central server 110 requests the cardinality for the tenant from each of the clusters 120 and sums the received cardinalities to determine a cardinality for the tenant over all clusters 120. The determined cardinality may be stored in the cardinality table 340.

In operation 440, the blacklist module 265 of the central server 110, based on the cardinality and a predetermined threshold, blocks at least some further data from the set of devices. As an example, the predetermined threshold is 8,388,608 and all further data from the tenant is blocked when the cardinality for the tenant exceeds the threshold until an administrator removes the block. As another example, the threshold is applied to a specific type of time-series data, the cardinality for the tenant is determined for the specific type of time-series data, and only the specific type of time-series data is blocked when the cardinality for the type of time-series data exceeds the predetermined threshold for cardinality for the type of time-series data. In some example embodiments, the blocking of the tenant (or the type of data for the tenant) is for a predetermined period of time (e.g., an hour, a day, or a week). The blocking of the data may be indicated by a row in the blacklist table 310. In some example embodiments, the data is only blocked if a system clock indicates that the current time is before the time in the expiration column. Thus, receipt of data for the tenant resumes at a time determined when the row was added to the blacklist table 310.

The central server 110 exposes blacklist information on an HTTP endpoint, e.g., http://${central hostname}/blacklist."

Information on the blacklisted tenants and metrics may be provided by the HTTP endpoint using the example data format:

```
{
    time: 1562457601,
    namespaces: [{
        namespace: "reco",
        type: "name",
        cardinality: 5823693,
        names: [{
            name: "algo_execution_duration_seconds",
            cardinality: 2363397
        }, {
            name: "algo_execution_duration_seconds_count",
            cardinality: 1132420
        }, {
            name: "algo_execution_duration_seconds_sum",
            cardinality: 1127671
        }]
    }, {
        namespace: "nodejs",
        type: "name",
        cardinality: 745681,
        names: [{
            name: "http_request_duration_ms",
            cardinality: 502731
        }]
    }]
}
```

In some example embodiments, in addition to operation 440 or as an alternative to operation 440, the central server 110, based on the cardinality and the predetermined threshold, sends a notification to an administrator account of the set of devices. The notification may allow the administrator to address the high cardinality of supplied data. If the notification is provided before the set of devices are blacklisted (e.g., a first threshold is used to trigger the sending of the notification and a second threshold is used to trigger the blacklisting), the notification may allow the administrator to correct the issue before blacklisting occurs. If the notification is provided after the set of devices are blacklisted (e.g., a single threshold is used to trigger both the sending of the notification and the blacklisting), the notification may allow the administrator to correct the issue and request manual removal of the blacklisting status before the expiration time.

Thus, by use of the method 400, the central server 110, in cooperation with the clusters 120, is able to monitor the cardinality of data provided by tenants and block data based on the cardinality and a predetermined threshold. As a result, data series of high cardinality are blocked, preventing the clusters 120 from allocating additional hardware resources to store the high-cardinality data series, thus saving hardware resources and improving performance for the unblocked time-series data being stored.

Figure 5:
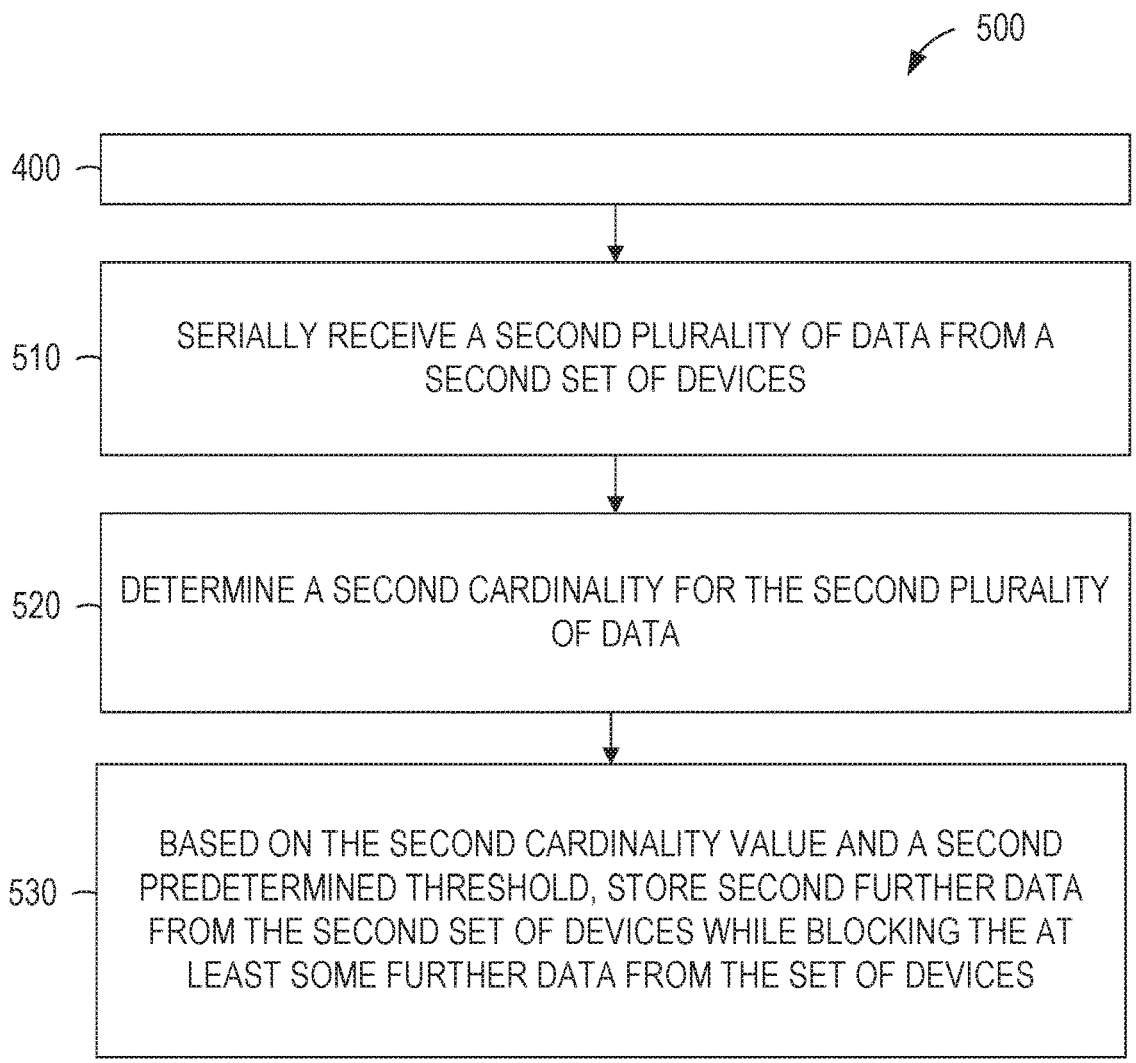
FIG. 5 is a flow diagram illustrating operations by a central server in a method of measuring and using cardinalities to block data from a tenant, according to some example embodiments.

FIG. 5 is a flow diagram illustrating operations by the central server 110 in a method 500 of measuring and using cardinalities to block data from a tenant, according to some example embodiments. The method 500 includes the method 400 and operations 510, 520, and 530 and may be used to enhance the method 400. By way of example and not limitation, the method 500 is described as being performed by the systems, modules, and databases of FIGS. 1-3.

In operation 510, the communication interface 235 of the central server 110 serially receives a second plurality of data from a second set of devices. As an example, a second set of devices sharing a second tenant identifier sends time-series data to the central server 110 for storage. The received data may be routed by the route module 270 to one or more clusters 120. The plurality of data and the second plurality of data may be interleaved. As an example, each device of the set of devices and the second set of devices periodically (e.g., once per second, once per minute, once per hour, or once per day) sends data representing information about the state of the device to the central server 110. Thus, the serially receiving of the plurality of data (in operation 410) and of the second plurality of data (in operation 510) may be overlapping and may each extend over a period of time.

The cardinality module 260 of the central server 110, in operation 520, determines a second cardinality of the second plurality of data. As in operation 430, this may be performed by having the cardinality module 260 of a server of each cluster 120 determine the cardinality for the portion of the second plurality of data stored on the cluster 120 and determining, by the cardinality module 260 of the central server 110, the total cardinality across all clusters 120.

In operation 530, based on the second cardinality and a second predetermined threshold, the route module 270 of the central server 110 causes second further data from the second set of devices to be stored while blocking the at least some further data from the set of devices. As an example and with reference to the cardinality table 340, the first plurality of data has cardinality 7,974,287 as shown in the row 360A and the second plurality of data has cardinality 7,074,135 as shown in the row 360D. Using a threshold of 7,500,000 for both tenants 101 and 104, the cardinality for tenant 101 has exceeded the threshold and the cardinality for tenant 104 has not. Accordingly, the blacklist table 310 includes the row 330A, showing that all data for tenant 101 is blocked, and does not include a row that indicates that data for tenant 104 is blocked. As a result, the route module 270 routes further received data for the tenant 104 to the clusters 120 while blocking further data from the tenant 101. In this example, the threshold for both tenants is the same, but the threshold may be determined on a per-tenant basis, a per-type basis, or a per-tenant-per-type basis.

Though the method 500 is described as handling two tenants, operations 510-530 may be repeated with appropriate modification for additional types of data and additional tenants. Thus, arbitrary numbers of tenants and data types may be supported, with arbitrary amounts of data being blocked according to the blacklist table 310 and the remaining time-series data stored in the clusters 120. Additionally, the use of a whitelist (indicating tenants that are allowed to store data) in addition to or instead of a blacklist is contemplated.

Figure 6:
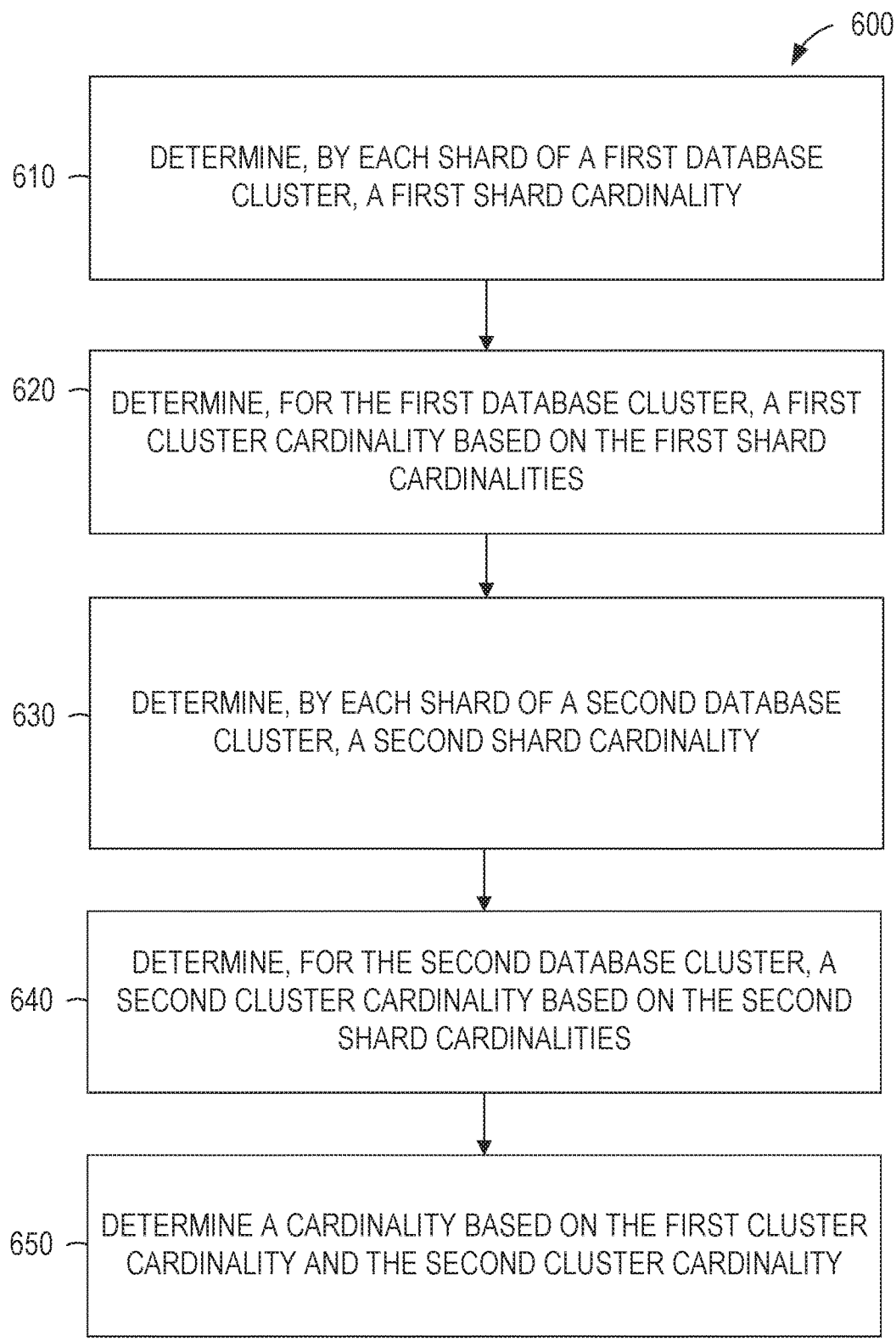
FIG. 6 is a flow diagram illustrating operations by a central server in a method of determining a cardinality, according to some example embodiments.

FIG. 6 is a flow diagram illustrating operations by one or more servers (e.g., the central server 110 in conjunction with servers of the clusters 120) in a method 600 of determining a cardinality, according to some example embodiments. The method 600 includes operations 610, 620, 630, 640, and 650. By way of example and not limitation, the method 600 is described as being performed by the systems, modules, and databases of FIGS. 1-3.

In operation 610, the cardinality module 260 of each shard of a first database cluster (e.g., the cluster 120A) determines a first shard cardinality for a tenant or for a type of time-series data for the tenant. The shard cardinality indicates the number of different data values (for the tenant or for the type of time-series data for the tenant) that are stored on the shard. Operation 610 may be performed periodically (e.g., once per hour) or continuously (e.g., with a cardinality that is updated upon the receipt of each new piece of data).

The cardinality module 260 of a server of the first database cluster, in operation 620, determines, for the first database cluster, a first cluster cardinality based on the first shard cardinalities. The first cluster cardinality may be the maximum of the first shard cardinalities or the sum of the first shared cardinalities. Operation 620 may be performed periodically (e.g., by querying each shard once per hour) or continuously (e.g., by receiving a notification from each shard whenever the shard updates a cardinality).

Operations 630 and 640 repeat operations 610 and 620 for a second database cluster, resulting in a second cluster cardinality. In operation 650, the cardinality module 260 of the central server 110 determines a cardinality based on the first cluster cardinality and the second cluster cardinality. For example, the cardinality may be the sum of the first cluster cardinality and the second cluster cardinality. The cardinality may be stored in the cardinality table 340.

Thus, by use of the method 600, the operations to determine the cardinality of time-series data are divided among shards, servers, and the central server 110. This division of labor allows for accurate cardinalities to be determined without overtaxing any one server and causing computation delays. Accordingly, use of the method 600 improves over prior art systems that accessed all time-series data by a single server to determine a cardinality for the time-series data.

Figure 7:
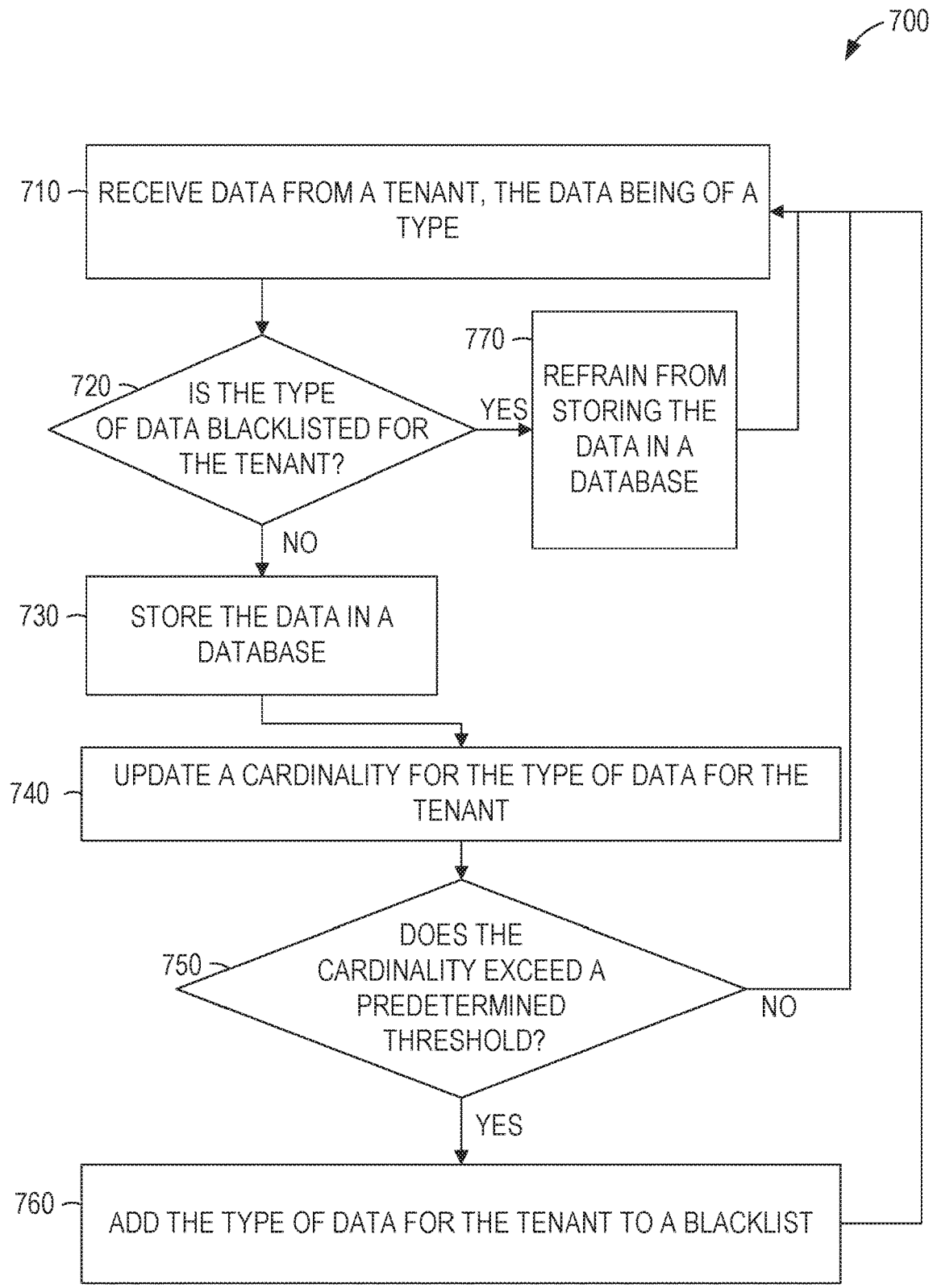
FIG. 7 is a flow diagram illustrating operations by a central server in a method of measuring and using cardinalities to block data from a tenant, according to some example embodiments.

FIG. 7 is a flow diagram illustrating operations by a central server in a method 700 of measuring and using cardinalities to block data from a tenant, according to some example embodiments. The method 700 includes operations 710, 720, 730, 740, 750, 760, and 770. By way of example and not limitation, the method 700 is described as being performed by the systems, modules, and databases of FIGS. 1-3.

In operation 710, the communication interface 235 of the central server 110 or a server of a cluster 120 receives data from a tenant, the data being of a type. The data may include a type identifier, a tenant identifier, a user identifier, a device identifier, a time stamp, a data value, or any suitable combination thereof.

The blacklist module 265 of the receiving server determines, in operation 720, if the type of data is blacklisted for the tenant. As an example, the blacklist table 310 is accessed to determine if the type field of a row for the tenant indicates that the type of data is blacklisted. If the type of data is not blacklisted, the method 700 proceeds with operation 730. If the type of data is blacklisted, the method 700 proceeds with operation 770.

In operation 730, the route module 270 stores the data in a database. As an example, a receiving server of a cluster 120 causes the data to be stored in the cluster 120. As another example, data received by the central server 110 is provided via a network 140 to a cluster 120 for storage.

The cardinality module 260, in operation 740, updates a cardinality for the type of data for the tenant. In some example embodiments, the cardinality is updated by the central server 110 and stored in the cardinality table 340 in response to the receipt of the data. In other example embodiments, a cardinality for a shard or a cluster is updated in response to the receipt of the data and later accessed by the central server 110 for use in determining the cardinality for storage in the cardinality table 340 (e.g., by using the method 600).

In operation 750, the blacklist module 265 determines if the cardinality for the type of data for the tenant exceeds a predetermined threshold. If the threshold is exceeded, the method 700 continues with operation 760. If the threshold is not exceeded, the method 700 returns to operation 710.

The blacklist module 265, in operation 760, adds the type of data for the tenant to a blacklist (e.g., by adding or updating a row in the blacklist table 310). After the blacklist is updated, the method 700 returns to operation 710.

In operation 770, resulting from a determination that the type of data is blacklisted for the tenant in operation 720, the route module 270 refrains from storing the data in the database and the method 700 returns to operation 710.

After execution of operation 750, 760, or 770 returns the method 700 to operation 710, the method 700 is repeated for data of the same type and tenant, a different type and the same tenant, the same type and a different tenant, or a different type and a different tenant. Thus, over multiple iterations, incoming data from multiple tenants and of multiple types is stored in a database so long as the cardinality for the particular type/tenant combination does not exceed the predetermined threshold.

In some example embodiments, the cardinality for each type of data for a tenant is summed to generate a cardinality for the tenant. The cardinality for the tenant is compared to a predetermined threshold and, if the cardinality exceeds the threshold, further data of all types is blocked for the tenant.

Further, the methods of blacklisting tenants and tenant/type pairs discussed herein may be implemented in combination with methods of dealing with high cardinality by allocating additional database shards. Thus, when the cardinality of a type of data for a tenant (or for all data for the tenant) exceeds a first predetermined threshold, an additional database shard is allocated for the data for the tenant. Multiple intermediate thresholds may be used to allocate multiple additional database shards. When the cardinality of the data increases beyond a second predetermined threshold, the data type for the tenant or the tenant as a whole is blacklisted.

The systems and methods described herein monitor the cardinality of data provided by tenants and block data based on the cardinality and a predetermined threshold. As a result of this technical improvement, data series of high cardinality are blocked, preventing the clusters 120 from allocating additional hardware resources to store the high-cardinality data series, thus saving hardware resources and improving performance for the unblocked time-series data being stored.

When these effects are considered in aggregate, one or more of the methodologies described herein may obviate a need for certain efforts or computing resources that otherwise would be involved in processing and storing time-series data. Additional computing resources used by one or more machines, databases, or devices (e.g., within the network environment 100) are saved by rate-limiting based on the cardinality computation. Examples of such computing resources include processor cycles, network traffic, memory usage, data storage capacity, power consumption, and cooling capacity.

Certain embodiments are described herein as including logic or a number of components, modules, or mechanisms. Modules may constitute either software modules (e.g., code embodied on a non-transitory machine-readable medium) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, in computer hardware, firmware, or software, or in combinations of them. Example embodiments may be implemented using a computer program product (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   a memory that stores instructions; and
   one or more processors configured by the instructions to perform operations comprising:
   serially receiving a plurality of data from a set of devices that is part of a single tenant of a cloud-based service;
   storing the plurality of data received from the set of devices that is part of the single tenant of the cloud-based service in a distributed database hosted by a plurality of database servers by storing a first subset of the plurality of data at a first database server and storing a second subset of the plurality of data at a second database server;
   receiving a first cardinality of the first subset of the plurality of data from the first database server and receiving a second cardinality of the second subset of the plurality of data from the second database server;
   determining a cardinality of the plurality of data received from the set of devices that is part of the single tenant of the cloud-based service based on a sum of the first cardinality of the first subset of the plurality of data and the second cardinality of the second subset of the plurality of data; and
   based on the cardinality of the plurality of data received and a predetermined threshold cardinality, blocking at least some further data from the set of devices that is part of the single tenant of the cloud-based service.

2. The system of claim 1, wherein the operations further comprise:
   serially receiving a second plurality of data from a second set of devices;
   determining a second cardinality of the second plurality of data; and
   based on the second cardinality and a second predetermined threshold cardinality, storing second further data from the second set of devices while blocking the at least some further data from the set of devices.

3. The system of claim 1, wherein the plurality of data serially received from the set of devices is associated with an identifier, and wherein the blocking of the at least some further data from the set of devices comprises blocking further data associated with the identifier from the set of devices.

4. The system of claim 1, wherein the first subset of the plurality of data is associated with a first identifier and the second subset of the plurality of data is associated with a second identifier.

5. The system of claim 1, wherein the operations further comprise:
   serially receiving a second plurality of data from a second set of devices;
   determining a second cardinality of the second plurality of data; and
   based on the second cardinality and a second predetermined threshold cardinality, allocating a database shard in the distributed database for the second set of devices.

6. The system of claim 5, wherein:
   the set of devices correspond to a first tenant; and
   the second set of devices correspond to a second tenant.

7. The system of claim 1, wherein the operations further comprise:
   after the blocking of the at least some further data from the set of devices:
   based on a system clock and a predetermined time, resuming receipt of data from the set of devices.

8. A method comprising:
   serially receiving a plurality of data from a set of devices that is part of a single tenant of a cloud-based service;
   storing, by one or more processors, the plurality of data received from the set of devices that is part of the single tenant of the cloud-based service in a distributed database hosted by a plurality of database servers by storing a first subset of the plurality of data at a first database server and storing a second subset of the plurality of data at a second database server;
   receiving a first cardinality of the first subset of the plurality of data from the first database server and receiving a second cardinality of the second subset of the plurality of data from the second database server;
   determining a cardinality of the plurality of data received from the set of devices that is part of the single tenant of the cloud-based service based on a sum of the first cardinality of the first subset of the plurality of data and the second cardinality of the second subset of the plurality of data; and based on the cardinality of the plurality of data received and a predetermined threshold cardinality, blocking at least some further data from the set of devices that is part of the single tenant of the cloud-based service.

9. The method of claim 8, further comprising:
serially receiving a second plurality of data from a second set of devices;
determining a second cardinality of the second plurality of data; and
based on the second cardinality and a second predetermined threshold cardinality, storing second further data from the second set of devices while blocking the at least some further data from the set of devices.

10. The method of claim 8, wherein the plurality of data serially received from the set of devices is associated with an identifier, and wherein the blocking of the at least some further data from the set of devices comprises blocking further data associated with the identifier from the set of devices.

11. The method of claim 8, wherein the first subset of the plurality of data is associated with a first identifier and the second subset of the plurality of data is associated with a second identifier.

12. The method of claim 8, further comprising:
serially receiving a second plurality of data from a second set of devices;
determining a second cardinality of the second plurality of data; and
based on the second cardinality and a second predetermined threshold cardinality, allocating a database shard in the distributed database for the second set of devices.

13. The method of claim 8, further comprising:
after the blocking of the at least some further data from the set of devices:
based on a system clock and a predetermined time of day, resuming receipt of data from the set of devices.

14. A non-transitory computer-readable medium that stores instructions that, when executed by one or more processors, cause the one or more processors to perform operations comprising:
serially receiving a plurality of data from a set of devices that is part of a single tenant of a cloud-based service;
storing the plurality of data received from the set of devices that is part of the single tenant of the cloud-based service in a distributed database hosted by a plurality of database servers by storing a first subset of the plurality of data at a first database server and storing a second subset of the plurality of data at a second database server;
receiving a first cardinality of the first subset of the plurality of data from the first database server and receiving a second cardinality of the second subset of the plurality of data from the second database server;
determining a cardinality of the plurality of data received from the set of devices that is part of the single tenant of the cloud-based service based on a sum of the first cardinality of the first subset of the plurality of data and the second cardinality of the second subset of the plurality of data; and
based on the cardinality of the plurality of data received and a predetermined threshold cardinality, blocking at least some further data from the set of devices that is part of the single tenant of the cloud-based service.

15. The computer-readable medium of claim 14, wherein the operations further comprise:
serially receiving a second plurality of data from a second set of devices;
determining a second cardinality of the second plurality of data; and
based on the second cardinality and a second predetermined threshold cardinality, storing second further data from the second set of devices while blocking the at least some further data from the set of devices.

16. The computer-readable medium of claim 14, wherein the first subset of the plurality of data is associated with a first identifier and the second subset of the plurality of data is associated with a second identifier.

17. The computer-readable medium of claim 14, wherein the operations further comprise:
serially receiving a second plurality of data from a second set of devices;
determining a second cardinality of the second plurality of data; and
based on the second cardinality and a second predetermined threshold cardinality, allocating a database shard in the distributed database for the second set of devices.

18. The computer-readable medium of claim 17, wherein:
the set of devices correspond to a first tenant; and
the second set of devices correspond to a second tenant.

19. The computer-readable medium of claim 14, wherein the operations further comprise:
after the blocking of the at least some further data from the set of devices:
based on a system clock and a predetermined time, resuming receipt of data from the set of devices.

20. The method of claim 8, further comprising, after the blocking of the at least some further data from the set of devices, resuming receipt of data from the set of devices based on a system clock and a predetermined time.

* * * * *